United States Patent [19]
Mueller et al.

[11] Patent Number: 4,822,868
[45] Date of Patent: Apr. 18, 1989

[54] POLYCARBONAMIDE OF BIS(2-(4-CARBOXYPHENYL)-HEXAFLUOROISOPROPYL)DIPHENYL ETHER

[75] Inventors: Werner H. Mueller, Greenwich; Dinesh Khanna, Warwick, both of R.I.

[73] Assignee: Hoechst Celanese Corporation, Somerville, N.J.

[21] Appl. No.: 124,744

[22] Filed: Nov. 24, 1987

[51] Int. Cl.$^4$ .................. C08G 69/32; C08G 65/00
[52] U.S. Cl. ............................ 528/208; 528/206; 528/348
[58] Field of Search .................. 528/208, 206, 348

[56] References Cited
U.S. PATENT DOCUMENTS 3,287,323  11/1966  Kwoler et al. ................ 260/78
3,328,352  6/1967  Kwoler ........................ 260/47
4,196,277  4/1980  Jones et al. ................... 528/208

Primary Examiner—Harold D. Anderson
Attorney, Agent, or Firm—Perman & Green

[57] ABSTRACT

This invention is directed to novel, linear polycarbonamides derived from the condensation of 4,4'-bis[2-(4-carboxyphenyl)hexafluoroisopropyl]diphenyl ether or a derivative thereof with a primary diamine; preferably an aromatic diamine. The novel, linear polycarbonamides of the invention are useful in preparing molded and extruded articles, films and fibers having high thermal stability, resistance to soiling, excellent mechanical properties, good transparency and radiation stability. In addition, they may be processed into useful articles at lower processing temperatures than the comparable polycarbonamides of the prior art.

14 Claims, No Drawings

POLYCARBONAMIDE OF BIS(2-(4-CARBOXYPHENYL)-HEXAFLUOROISOPROPYL)DIPHENYL ETHER

BACKGROUND OF THE INVENTION

Polycarbonates are well known in the art as useful polymers for the preparation of molded articles, films, fibers, protective coatings and numerous other applications. The most well known polycarbonamides of the art are those generically known as nylon such as nylon 6,6, nylon 6, nlyon 6,10 etc. These polyamides are prepared by the condensation of an aliphatic diamine and aliphatic dicarboxylic acid by a variety of well known polymerization techniques.

Aromatic polycarbonamides, generically known as aramids are also well known in the art. However, because of their high melting points, they cannot be processed by conventional melt fabrication methods and have limited commercial applications. Exemplary of this class of polycarbonamides are those disclosed in U.S. Pat. No. 3,328,352 to Kwolek. The polyamides of this publication are reported to have a minimum melting point of 350° C. Another illustrative aromatic polycarbonamide of the aramid type is the poly(para-benzamide) sold under trademark designation Kevlar 49. The preparation of this polyamide is described in U.K. Patent No. 1,198,081 and it is not processible by conventional melt processing methods. Similarly, mixed aromatic/aliphatic polyamides are known in the art; see, for example, U.S. Pat. No. 3,287,323 which describes the condensation of m-phenylene diamine with adipic, suberic and sebacic acids.

It is the object of ths invention to provide novel polycarbonamides of the above classes which are the condensation products of 4,4'-bis-[2-(4-carboxyphenyl)-hexafluoroisopropyl]-diphenyl ether with an aromatic, aliphatic or alicyclic diamine or mixtures thereof. These novel polyamides have useful mechanical, chemical and physical properties and they may be melt fabricated.

SUMMARY OF THE INVENTION

A polycarbonamide having a recurring structure in the polymer chain which may be represented by the formula:

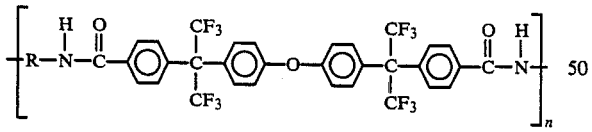

wherein R is a divalent group selected from an aromatic, aliphatic and alicyclic aliphatic moiety or mixtures thereof. The symbol "n" represents an integer sufficiently high to provide a film or fiber forming polymer.

The polyamides of the invention are useful in preparing molded and extruded articles, films and fibers having excellent mechanical, chemical, radiation, thermal and soil resistance properties. They may also be dry spun to fibers from solution and they may be employed in solution to provide protective coatings. In addition, the polycarbonamides of the invention have a lower glass transition temperature than the comparable polycarbonamides of the prior art which adapts them to melt fabrication at a lower processing temperature.

DESCRIPTION OF THE PREFERRED EMBODIMENTS

The polyamides of this invention are characterized as having the following recurring structure in the polymer chain:

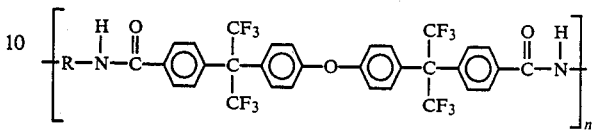

wherein R is a divalent group which is the residuum of a diamine and it is selected from an aromatic moiety, an aliphatic moiety and a alicyclic aliphatic moiety or mixtures thereof. The integer n is a number sufficiently high to provide a high molecular weight polymer having an inherent viscosity of at least 0.2 dl/g in dimethyacetamide at 0.5% by weight polymer concentration at 25° C.; preferably, about 0.3 to 4.0 dl/g.

The divalent group "R" may be selected from an aromatic moiety having 1 to 4 rings of six carbon atoms characterized by benzenoid unsaturation which may be represent by the formulae:

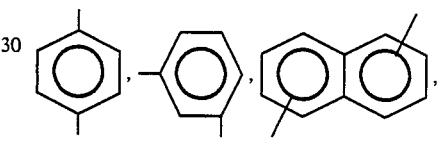

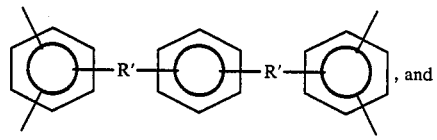

, and

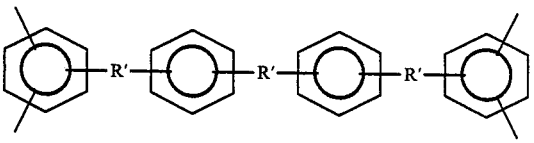

wherein R' is a divalent moiety independently selected from a covalent carbon to carbon bond, methylene, ethylene, propylene, isopropylene, hexafluoroisopropyliodene, 1-phenyl-2,2,2-trifluoroethylidene, dichloro and difluoroalkylenes up to 3 carbons, oxy, thio, sulfinyl, sulfonyl, sulfonamide, carbonyl, oxydicarbonyl, oxydimethylene, sulfonyldioxy, carbonyldioxy, silanylene, disilanylene, polysilanylene up to 8 Si atoms; siloxanylene, disiloxanylene and a polysiloxanyene up to 8 Si atoms. Preferably, the linking group R' is selected from oxy, hexafluoroisopropylidene, 1-phenyl-2,2,2-trifluoroethylidene, carbonyl, methylene, a covalent carbon to carbon bond, disiloxanylene and polysiloxanylenes, most preferably, carbon to carbon bond, hexafluoroisopropylidene, 1-phenyl-2,2,2-trifluoroethylidene and oxy.

The hydrogen atoms of the groups R and R' may be substituted by non-interferring monovalent substituents such as chloro, fluoro, lower alkyl up to 6 carbons (such as methyl, ethyl, propyl) and phenyl. Also as used herein, the term aromatic is meant to include heteroaromatics wherein one or more of the ring atoms is replaced with —O—, —S—, or —N— atoms.

The moiety R may also be selected from alkylene moiety having one to twenty carbons or an alicyclic aliphatic moiety having from four to eighteen carbons.

The polyamides of the invention are prepared by standard condensation polymerization techniques well known in the art; see, for example, U.S. Pat. Nos. 3,287,323 and 3,328,352; the teachings of which are hereby incorporated by reference. High molecular weight polymers of the invention may be produced by interfacial or solvent polymerization by reacting at least one aromatic diacid chloride of 4,4-bis[2-(4-carboxyphenyl)hexafluoroisopropyl]diphenyl ether or a substituted derivative thereof with a primary diamine. The preparation of this diacid chloride follows:

EXAMPLE 1

Preparation of
4,4-bis[2-(4-chlorocarbonylphenyl)-hexafluoroisopropyl]diphenyl ether (a) To a clean, dry stainless steel autoclave are charged 4,4'-bis(2-hydroxy-hexafluoroisopropyl)diphenylether—synthesized according to U.S. Pat. No. 3,355,500—toluene toluene and hydrogen fluoride in a molar ratio of at least 1:2:10 followed by sealing and heating at temperatures between 100 and 170° C. for 24 to 96 hours. At 80° C. the autoclave is vented and hydrogen fluoride is evaporated. After cooling to room temperature methylene chloride is added and the reaction mixture is discharged into water. The organic layer is separated, washed twice with water and dried over calcium chloride. The solvent is stripped off and the residue is recrystallized from ethanol yielding 4,4'-bis-[2-(4-methylphenyl)hexafluoroisopropyl]diphenylether. M.P. 80°–90° C.

(b) 4,4'-bis[2-(4-methylphenyl)hexafluoroisopropyl]diphenyl ether is dissolved in acetic acid and a catalyst prepared from Co(OAc)$_2$.4 H$_2$O, Mn(OAc)$_2$.4 H$_2$O and HBr in acetic acid is added. The reaction is performed in a glass pressure vessel by heating the mixture up to 180° C. and an oxygen pressure of 6.5 bar. After the oxygen uptake has finished the contents of the reaction vessel are discharged into a distillation apparatus and acetic acid is distilled off. The residue is cooled to room temperature and the crystalline product is collected on a funnel. After washing several times with acetic acid and water the 4,4'-bis[2-(4-carboxy-phenyl)hexafluoroisopropyl]diphenylether is dried in vacuo. M.P. 238°–240° C.

(c) To a slurry of 4,4'-bis[2-(4-carboxyphenyl)hexafluoro-isopropyl]diphenylether in thionylchloride are added a few drops of dimethylformamide. The mixture is heated at reflux till the evolution of hydrogen chloride stops. The excess of thionylchloride is stripped off. Toluene is added to remove the residual thionylchloride by distillation. The solvent is stripped off and the crude product is recrystallized from n-hexane. M.P. 144°–145° C.

Illustrative aromatic diamines that may be used in the practice of the invention are:

m-phenylene diamine;
p-phenylene diamine;
4,4'diaminodiphenyl ether;
3,3'-diaminodiphenyl ether;
3,4'-diaminodiphenyl ether;
1,3-bis-(aminophenoxy)benzene (m-APB);
1,4-bis(aminophenoxy)benzene (p-APB);
benzidine;
3,3'-dimethyl benzidine;
3,3'-diaminodiphenyl methane;
4,4'-diaminodiphenyl methane;
4'-diaminodiphenyl propane;
3,3'-diaminodiphenyl sulfone;
4,4'-diaminodiphenyl sulfone;
4,4'-diaminodiphenyl sulfide;
α,α'-bis(aminophenyl)p-diisopropylbenzene;
1,3-bis[4(4-aminophenoxy)-α,α'-bistrifluoromethyl]benzene;
2,2-bis[4-(4-aminophenoxy)-phenyl]hexafluoro-propane;
hexafluoro-2,2-bis-(3-amino-4-methylphenyl)-propane;
2,2-bis-(4-aminophenyl)propane;
hexafluoro-2,2-bis-(3-aminophenyl)propane;
m-xylylenediamine;
p-xylylenediamine;
4,4'-bis(p-aminophenoxy)diphenyl sulfide;
4,4'-bis(3"-aminophenoxy)diphenyl sulfide;
4,4'(3"-aminophenoxy-(4'-aminophenoxy)-diphenyl sulfide;
4,4'-bis(p-aminophenoxy)diphenyl sulfone;
4,4'-bis-(3"-aminophenyl)sulfone;
2,2-bis-[4'(p-aminophenoxy)pheny1]propane;
2,2-bis-[3'(p-aminophenoxy)phenyl)]propane;
1,1-bis-[4'(p-aminophenoxy)phenyl]ethylbenzene and mixtures thereof.

Illustrative of the aliphatic and alicyclic aliphatic diamines useful in preparing polyamides of the invention are: 1,2-bis(3-aminopropoxy)ethane; bis(4-aminocyclohexyl)methane; hexamethylene diamine, octamethylene diamine; 1,4-cyclohexane diamine; decamethylene diamine; dodecamethylene diamine, bis(3-aminopropyl)sulfide; 3-methyl-hexamethylene diamine, 1,3-diaminopropane, 2,6-diamino-cyclohexane, ethylene diamine, tetramethylene diamine, and the like and mixtures thereof.

A portion of the 4,4'-bis[2-(4-chlorocarbonylphenyl)hexafluoroisopropyl]diphenyl ether may be replaced with another diacid chloride. Illustrative of such comonomers are the diacid chlorides of:

isophthalic acid;
terephthalic acid;
4,4'-hexafluoroisopropylidene dibenzoic acid;
1,4-phenylenediethanoic acid;
4,4-biphenyl dicarboxylic acid;
1,1-bis(4-carboxyphenyl)-1-phenyl-2,2,2-trifluoro ethane;
4,4'-dicarboxy diphenyl ether;
bis-(4-carboxyphenyl)-methyl phosphane oxide;
4,4'-dicarboxyltetraphenylsilane;
bis(4-carboxyphenol)-sulfone;
5-tertiary butyl isophthalic acid;
5-bromoisophthalic acid;
5-fluoro-isophthalic acid;

5-chloro-isoophthalic acid;
2,2-bis-(p-carboxyphenyl)propane;
4,4-(p-phenylenedioxy) dibenzoic acid;
2,6-naphthalene dicarboxylic acid;
1,4-cyclohexane dicarboxylic acid;
1,3-cyclopentane dicarboxylic acid;
oxalic acid;
1,2-cyclobutadane dicarboxylic acid;
1,4-cyclohexane diacetic acid;
malonic acid;
1,10-decane dicarboxylic acid;
succinic acid;
1,12-dodecane dicarboxylic acid;
1,18-octadecane dicarboxylic acid;
2,6-cyclohexane dicarboxylic acid;
adipic acid;
2,6-cyclohexane dihexanoic acid;
bis[2-(carboxylphenyl)hexafluoroisopropyl]diphenyl ether and mixtures thereof.

Preferred diamine reactants are selected from:

hexamethylene diamine;
p-phenylene diamine;
meta-phenylene diamine;
2,2-bis[4-(4-aminophenoxy)phenyl]hexafluoropropane;
3,4-diaminodiphenyl ether;
4,4'-diaminodiphenyl ether;
2,2-hexafluoro-bis(3-aminophenyl)propane;
2,2-hexafluoro-bis(4-aminophenyl)propane; 1,1-bis(4-aminophenyl)-1-phenyl-2,2,2-trifluoro-ethane and mixtures thereof.

The following Examples illustrates the invention:

EXAMPLE 2

Into a blender were placed 37.5 ml of water, 37.5 ml of tetrahydrofuran, 1.67 gram (0.05 moles) 2,2-hexafluoro-bis(4-aminophenyl)propane, 1.06 gram of sodium bicarbonate and 0.1 gram of benzyltriethylammonium chloride. The contents of the blender were stirred rapidly for 5 minutes. A solution of 3.735 grams (0.05 moles) of 4,4-bis[2-(4-chlorocarbonylphenyl)hexafluoroisopropyl]diphenyl ether in 22.5 ml tetrahydrofuran was added over a period of three minutes. An emulsion formed which was stirred for ten minutes, after which 300 ml of water were added to precipitate the polymer. This mixture was stirred for an additional ten minutes, filtered on a buchner funnel washed with water and dried in vacuum oven over night at 90°–100° C. The yield of the polymer nearly quantitative. The polymer is soluble in cold dimethylacetamide and rapidly goes into solution on heating. The polymer has an inherent viscosity of 1.46 dl/g. The polymer has a high molecular weight and tough, transparent films were prepared by solvent casting technique using a dimethylacetamide solvent.

The polyamide of this example was analyzed by differential scanning calorimetry and its glass transition temperature was determined to be 221° C.

EXAMPLE 3

Into a blender were placed 37.5 ml of water, 37.5 ml of tetrahydrofuran, 1.001 gram (0.006 moles) of 4,4'diaminodiphenyl ether, 1.06 gram of sodium bicarbonate and 0.1 gram of benzyltrialkylammonium chloride. The contents of the blender were stirred rapidly for 5 minutes. A solution of 3.735 gram (0.05 moles) of 4,4'-bis[2-(4-chlorocarbonylphenyl)hexafluoroisopropyl]diphenyl ether in 22.5 ml tetrahydrofuran was then added over a period of three minutes. An emulsion formed which was stirred for ten minutes and then 300 ml of water were added to precipitate the polymer. This mixture was stirred for additonal ten minutes, filtered on a buchner funnel washed with water and dried in vacuum oven over night at 90–100° C. The yield of the polymer was nearly quantitative. The polymer is not very soluble in cold dimethylacetamide but goes into solution on heating. The polymer has an inherent viscosity of 2.42 dl/g. The polymer has a very high molecular weight and tough films can be prepared by solvent casting technique. This example illustrates preparation of a very high molecular weight polymer which is confirmed by the inherent viscosity and some difficulty in solubilizing it at room temperature in dimethylacetamide.

The polyamide of this example was analyzed by differential scanning calorimetry and its glass transition temperature was determined to be 193° C.

EXAMPLE 4

The procedure of Example 2 was repeated except the 4,4-bis[2-(4-chlorocarbonylphenyl)hexafluoroisopropyl]diphenyl ether was replaced by an equal molar quantity of 2,2-hexafluoro-bis(4-chlorocarbonylphenyl)propane. The inherent viscosity of the resulting polymer was 0.59 dl/g and the glass transition temperature was determined to be 318°. This example illustrates the high temperature processing characteristics of the polyamides of the prior art. This can be seen by comparing the glass transition temperatures of examples 2 and 3 (the invention) with the glass transition temperature of this prior art polyamide. These polymers of the invention exhibit a glass transition temperature approximately 100° C. lower than the prior comparable art polymer.

EXAMPLES 5–7

The procedure of Example 2 can be repeated using the following diamines instead of 2,2-hexafluoro-bis-(4-amino-phenyl)propane:
Ex. 5—2,2-bis[4-(4-aminophenoxy)phenyl]hexafluoropropane
Ex. 6—2,2-hexafluoro-bis(3-aminophenyl)propane
Ex. 7—3,4'-diaminodiphenyl ether
Ex. 8—1,1-bis(4-aminophenyl)-1-phenyl-2,2,2-trifluoroethane The polyamides of Examples 5–8 may be processed into films and fibers.

The polyamides of the invention either alone or in combination with other materials may be shaped into useful articles; e.g. by molding, extrusion, spinning, solution casting and other known processes. Illustrative applications of the polymers of the invention include molded parts such as high temperature insulators, transparent fuel filter assemblies, seals, gaskets, thrustwashers, pipes of high thermal stability and corrosion resistance, high temperature and inert insulating, passivation and protective films, high strength-heat resistant fibers in tire cords, flame resistant clothing, ballistic protection vests, composite articles with other organic and/or inorganic fillers and fibers or in open fiber mats as the impregnating material in laminates and other applications obvious to the skilled artisan. Advantageously fillers such as glass fibers, silica, molybdenum, graphite, and PTFE may be compounded or blended with the above specified polyamides to form molding and extrusion composition.

In the preparation of laminates, a laminating varnish may be prepared by dissolving the above specified polyamides in a suitable solvent such as N-methylpyrrolidone, diglyme, dimethylformamide, propyl glycol methyl ether, etc. The polyamides varnish solution is then applied to a suitable reinforcing fabric such as a boron fiber fabric, a quartz fiber fabric, graphite or glass fabric and the solvent removed and a fused shaped part is formed using vacuum bag or autoclave laminating procedures. Similarly, these polyamides may be processed into fibers by melt or solution techniques and knitted or braided into a fabric or structural form which is then laminated with a reinforcing fabric of glass, boron, quartz or graphite, optionally with a laminating varnish, under heat and pressure. Similarly, glass, quartz, boron and graphite fibers may be mixed with a solution of these polyamides, the solvent removed by heat and optionally reduced pressure and the mixture fused into an article of the desired shape by the use of heat and pressure.

The invention has been described by way of the above specification and illustrative examples and it is to be understood that this invention is not limited to the specific embodiments thereof except as defined by the following claims:

We claim:

1. A polycarbonamide polymer having a recurring unit in the polymer chain represented by the following structure:

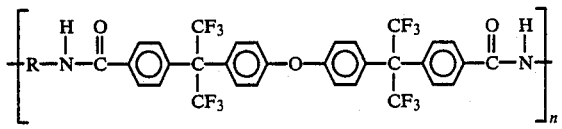

wherein R is a divalent group selected from: an aromatic moiety having from 1 to 4 rings of six-carbon atoms wherein said ring is characterized by benzenoid unsaturation, an aliphatic moiety of 1 to 20 carbon atoms, an alicyclic aliphatic moiety of 4 to eighteen carbon atoms or mixtures thereof; and said polymer having an inherent viscosity in dimethylacetamide of at least 0.2 dl/g at 25° C. and 0.5 weight percent polymer concentration.

2. A polycarbonamide according to claim 1 wherein said divalent radical R is the residium of a diamine; said diamine being selected from hexamethylene diamine, para-phenylene diamine, meta-phenylene diamine, 2,2-bis[4-(4-aminophenoxy)phenyl]hexafluoropropane, 3,4'-diaminodiphenyl ether, 4,4'-diamino-diphenyl ether, 2,2-hexafluoro-bis(3-aminophenyl)propane, 2,2-hexafluoro-bis(4-aminophenyl)propane, 1,1-bis(4-aminophenyl)-1-phenyl-2,2,2-trifluoroethane or mixtures thereof.

3. A fiber prepared from a polycarbonamide of claim 1.

4. A film prepared from a polycarbonamide of claim 1.

5. A fiber prepared from a polycarbonamide of claim 2.

6. A film prepared from a polycarbonamide of claim 2.

7. A molded article of a polycarbonamide according to claim 1.

8. A molded article of a polycarbonamide according to claim 2.

9. A laminated structure comprising a polycarbonamide according to claim 1 and a fibrous reinforcing material.

10. A polycarbonamide according to claim 2 wherein said diamine is 2,2-hexafluoro-bis(4-aminophenyl)propane.

11. A polycarbonamide according to claim 2 wherein said diamine is 2,2-hexafluoro-bis (3-aminophenyl)propane.

12. A polycarbonamide according to claim 2 wherein said diamine is para-phenylene diamine.

13. A polycarbonamide according to claim 2 wherein said diamine is meta-phenylene diamine.

14. A polycarbonamide according to claim 2 wherein said diamine is 4,4' diaminodiphenyl ether.

* * * * *